(12) United States Patent
Jeon et al.

(10) Patent No.: US 9,338,646 B2
(45) Date of Patent: May 10, 2016

(54) METHOD FOR TRANSMITTING AND RECEIVING FAKE COMMUNICATION DATA AND TERMINAL PERFORMING THE SAME

(71) Applicant: ELECTRONICS AND TELECOMMUNICATIONS RESEARCH INSTITUTE, Daejeon (KR)

(72) Inventors: Sungho Jeon, Busan (KR); Jeong-Han Yun, Daejeon (KR); Woonyon Kim, Daejeon (KR); Jungtaek Seo, Daejeon (KR); Eung Ki Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 47 days.

(21) Appl. No.: 14/474,250

(22) Filed: Sep. 1, 2014

(65) Prior Publication Data

US 2015/0304839 A1    Oct. 22, 2015

(30) Foreign Application Priority Data

Apr. 22, 2014  (KR) .......................... 10-2014-0047870

(51) Int. Cl.
*H04M 1/66*   (2006.01)
*H04W 12/02*  (2009.01)
(Continued)

(52) U.S. Cl.
CPC .............. *H04W 12/02* (2013.01); *G06Q 50/265* (2013.01); *H04K 3/825* (2013.01); *H04L 63/04* (2013.01); *H04L 63/1475* (2013.01); *H04M 1/68* (2013.01); *H04W 4/16* (2013.01)

(58) Field of Classification Search
CPC ............ H04L 63/1416; H04L 63/1441; H04L 63/145; H04L 67/025; H04W 12/12
USPC .................................................. 455/410, 456
See application file for complete search history.

(56) References Cited

U.S. PATENT DOCUMENTS

| 6,986,036 B2 | 1/2006 | Wang et al. | |
| 2006/0099978 A1* | 5/2006 | Kim ........................ | H04L 51/38 455/466 |

(Continued)

FOREIGN PATENT DOCUMENTS

| EP | 2 579 635 A2 | 4/2013 |
| JP | 2013-225863 A | 10/2013 |
| KR | 10-2013-0095571 A | 8/2013 |

OTHER PUBLICATIONS

Yajin Zhou et al., "Taming Information-Stealing Smartphone Applications (on Android)," Trust and Trustworthy Computing, Lecture Notes in Computer Sciences, 2011.

(Continued)

*Primary Examiner* — Qutbuddin Ghulamali
(74) *Attorney, Agent, or Firm* — LRK Patent Law Firm (57) ABSTRACT

A technology for preventing leakage of personal information from traffics of terminals by transmitting and receiving fake communication data artificially generated so that an attacker does not identify normal communication between terminals is provided. A method for transmitting fake communication data includes: making a response request to whether or not a fake communication application is presented in an opponent terminal using an address book registered in a terminal; receiving a response corresponding to the response request and selecting targets to and from which the fake communication data are to be transmitted and received in a terminal list corresponding to the received response; controlling a communication amount depending on the selected targets; and transmitting the fake communication data to a corresponding receiving terminal depending on a control result.

6 Claims, 5 Drawing Sheets

(51) Int. Cl.
    *H04M 1/68*     (2006.01)
    *G06Q 50/26*     (2012.01)
    *H04W 4/16*     (2009.01)
    *H04K 3/00*     (2006.01)
    *H04L 29/06*     (2006.01)

(56) References Cited

U.S. PATENT DOCUMENTS

| | | | | |
|---|---|---|---|---|
| 2010/0024034 | A1 | 1/2010 | Cohen | |
| 2011/0305158 | A1* | 12/2011 | Kim | H04W 72/005 370/252 |
| 2013/0183975 | A1* | 7/2013 | Hyun | H04W 36/22 455/436 |

OTHER PUBLICATIONS

William Conner et al., "Using Data Aggregation to Prevent Traffic Analysis in Wireless Sensor Networks," Jan. 1, 2006, Distributed Computing in Sensor Systems Lecture Notes in Computer Science;; LNCS, Springer, Berlin, DE, pp. 202217, XP019034993, ISBN: 978-3-540-35227-3 (p. 4, line 10-p. 11, line 14).

Yousef Ebrahimi et al., "Using deceptive packets to increase base-station anonymity in wireless sensor network," Wireless Communications and Mobile Computing Conference (IWCMC), 2011 7th International, IEEE, Jul. 4, 2011, pp. 842-847, XP031925738, DOI: 10.1109/WCMC.2011.5982656 ISBN: 978-1-4244-9539-9 (p. 843, right-hand column, line 23—p. 847, left-hand column, line 5; figures 2-10).

\* cited by examiner

METHOD FOR TRANSMITTING AND RECEIVING FAKE COMMUNICATION DATA AND TERMINAL PERFORMING THE SAME

CROSS REFERENCE TO RELATED APPLICATION

This application claims the benefit of Korean Patent Application No. 10-2014-0047870, filed on Apr. 22, 2014, which is hereby incorporated by reference in its entirety into this application.

BACKGROUND OF THE INVENTION

1. Technical Field

The present invention relates to a method for transmitting and receiving fake communication data and a terminal performing the same, and more particularly, to a technology of preventing leakage of personal information from traffics of terminals by transmitting and receiving fake communication data artificially generated so that an attacker does not identify normal communication between terminals.

2. Description of the Related Art

In accordance with popularization of smart phones, development of performance of the smart phones, and multi-functionalization of the smart phones, people have used the smart phones for several purposes for life and convenience such as Internet banking as well as business while always carrying the smart phones. This change significantly contributes to improving work efficiency, but causes a serious problem such as leakage of personal information.

For example, Korean Patent Application Publication No. 10-2013-0095571 entitled "Method for Blocking Leakage of Personal Information in Smart Phone" has disclosed a technology in which a smart phone downloading an application supporting blocking of leakage of personal information through a communication network and installing the application monitors exposure of the personal information in real time, displays a warning message inquiring whether or not the leakage of the personal information is allowed on a screen when the exposure of the personal information is attempted from another communication terminal or Internet site, provides the personal information to the corresponding communication terminal or Internet site or blocks the provision of the personal information based on whether or not a uses confirming the warning message allows the leakage of the personal information.

There is a study on a technology of encrypting communication contents in order to prevent eavesdropping in the smart phone. However, a communication target itself as well as the communication contents may leak important information. For example, when a decision maker of an important deal makes more calls to interested parties of a company A among interested parties of companies A and B with which he/she wants to make a deal in office hours, it may be inferred that it is likely that the company A will accomplish the deal. In addition, a human network and a human relation of a smart phone user may also be inferred through a recent call frequency, a call time, and the like, of the smart phone. Even though position information of the user is encrypted, when sites recently accessed by the user are limited to a specific region, it may be inferred that the user is currently present at that position or is scheduled to visit that position.

There is a study on a technology of blocking or informing the user that an external user requests information without permission in order to prevent the leakage of the personal information in the smart phone. However, there is the possibility that the external user will bypass a blocking application in order to avoid the blocking. For example, the external user may use other permitted communication ports or disguise his/her communication as normal communication. Therefore, a method for basically preventing useful information from being extracted is required.

SUMMARY OF THE INVENTION

Accordingly, the present invention has been made keeping in mind the above problems occurring in the conventional art, and an object of the present invention is to provide a method for preventing leakage of personal information from traffics of terminals by transmitting and receiving fake communication data artificially generated so that an attacker does not identify normal communication between terminals.

In accordance with an aspect of the present invention, there is provided a method for transmitting fake communication data, including: making a response request to whether or not a fake communication application is presented in an opponent terminal using an address book registered in a terminal; receiving a response corresponding to the response request and selecting targets to and from which the fake communication data are to be transmitted and received in a terminal list corresponding to the received response; controlling a communication amount depending on the selected targets; and transmitting the fake communication data to a corresponding receiving terminal depending on a control result.

The controlling may include dividing the selected targets into groups and controlling a time in which communication is performed for each of the groups.

In the controlling of the time in which communication is performed for each of the groups, an average value of a normal distribution having a center of each time as an average value may be controlled.

The controlling may include dividing the selected targets into groups and setting a weight depending on a phone number with which communication is performed for each of the groups to control the communication amount.

In accordance with another aspect of the present invention, there is provided a terminal for transmitting fake communication data, including: a response requesting unit making a response request to whether or not a fake communication application is presented in an opponent terminal using an address book registered in a terminal; a target selecting unit receiving a response corresponding to the response request and selecting targets to and from which the fake communication data are to be transmitted and received in a terminal list corresponding to the received response; a communication controlling unit controlling a communication amount depending on the selected targets; and a data transmitting unit transmitting the fake communication data to a corresponding receiving terminal depending on a control result.

The communication controlling unit may divide the selected targets into groups and control a time in which communication is performed for each of the groups.

The communication controlling unit may control an average value of a normal distribution having a center of each time as an average value.

The communication controlling unit may divide the selected targets into groups and set a weight depending on a phone number with which communication is performed for each of the groups to control the communication amount.

In accordance with still another aspect of the present invention, there is provided a method for receiving fake communication data, including: receiving data from a transmitting terminal including a fake communication application; confirming whether an identification value meaning fake communication is present in the data; and filtering a traffic with the transmitting terminal in the case in which the identification value is present in the data.

The method for receiving fake communication data may further include, before the receiving of the data, receiving a response request to whether the fake communication application is present from the transmitting terminal; and transferring a response corresponding to the response request.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Exemplary embodiments of the present invention will be described in detail with reference to the accompanying drawings. In the present specification, a repetitive description, and a detailed description of well-known functions or constructions that may unnecessarily obscure the gist of the present invention will be omitted. Exemplary embodiments of the present invention are provided in order to fully convey the concept of the present invention to those skilled in the art. In the accompanying drawings of the present invention, shapes, dimensions, and the like, of components may be exaggerated for clarity.

Hereinafter, a method for transmitting and receiving fake communication data and a terminal performing the same according to an exemplary embodiment of the present invention will be described in detail with reference to the accompanying drawings.

Figure 1:
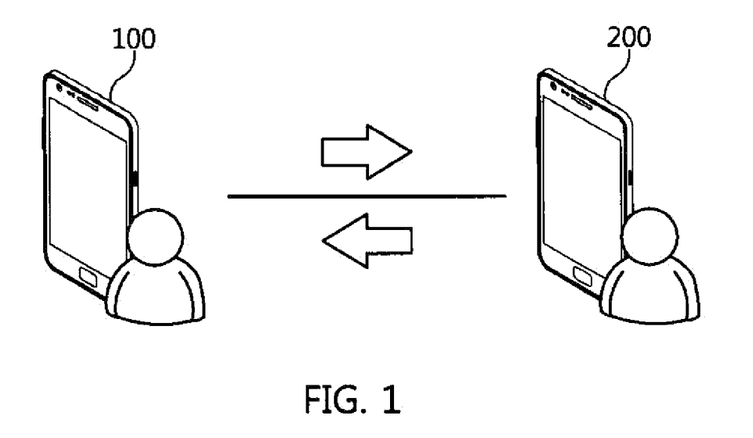
FIG. 1 is a diagram showing a communication environment between terminals transmitting and receiving fake communication data according to an exemplary embodiment of the present invention.

FIG. 1 is a diagram showing a communication environment between terminals transmitting and receiving fake communication data according to an exemplary embodiment of the present invention.

Referring to FIG. 1, a transmitting terminal 100 includes a fake communication application (FCA) and transmits fake communication data to a receiving terminal 200 through the fake communication application. Here, the receiving terminal 200 is characterized in that it includes the fake communication application (FCA), similar to the transmitting terminal 100.

As described above, traffics between the transmitting terminal 100 and the receiving terminal 200 mean all communications such as calls, text messages, Internet, and the like.

In a method for transmitting and receiving fake communication data according to an exemplary embodiment of the present invention, it is assumed that contents transmitted from the transmitting terminal are encrypted.

Therefore, an attacker may recognize traffic information transmitted or received by the terminals, but does not recognize contents.

That is, in the present invention, the fake communication data are transmitted and received between the terminals to allow the attacker not to identify normal communication, thereby making it possible to prevent leakage of personal information such as call targets, communication patterns of each target, a data communication tendency, and the like, from the traffic of the terminal.

Next, configurations of the transmitting terminal 100 and the receiving terminal 200 transmitting and receiving the fake communication data will be described with reference to FIGS. 2 and 3.

Figure 2:
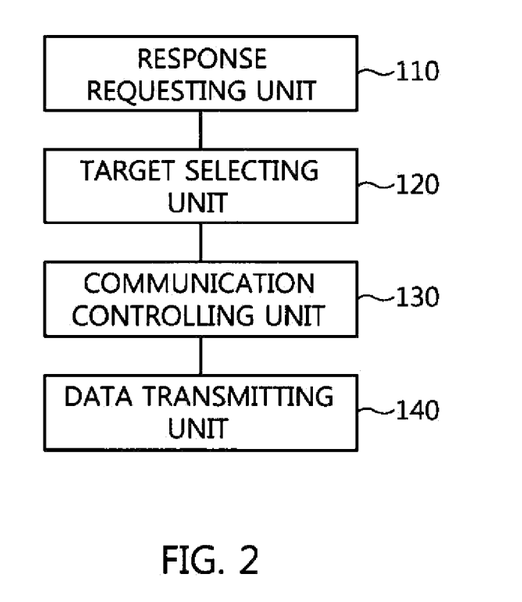
FIG. 2 is a configuration diagram schematically showing a transmitting terminal transmitting fake communication data according to an exemplary embodiment of the present invention.

FIG. 2 is a configuration diagram schematically showing a transmitting terminal transmitting fake communication data according to an exemplary embodiment of the present invention.

Referring to FIG. 2, the transmitting terminal 100 may include a response requesting unit 110, a target selecting unit 120, a communication controlling unit 130, and a data transmitting unit 140.

The response requesting unit 110 makes a response request to whether or not the fake communication application (FCA) is presented in an opponent terminal using an address book registered in the terminal in order to decide targets to and from which the fake communication data are to be transmitted and received, that is, receiving terminals.

The target selecting unit 120 receives a response corresponding to the response request and selects the targets to and from which the fake communication data are to be transmitted and received in a terminal list corresponding to the received response.

Figure 4:
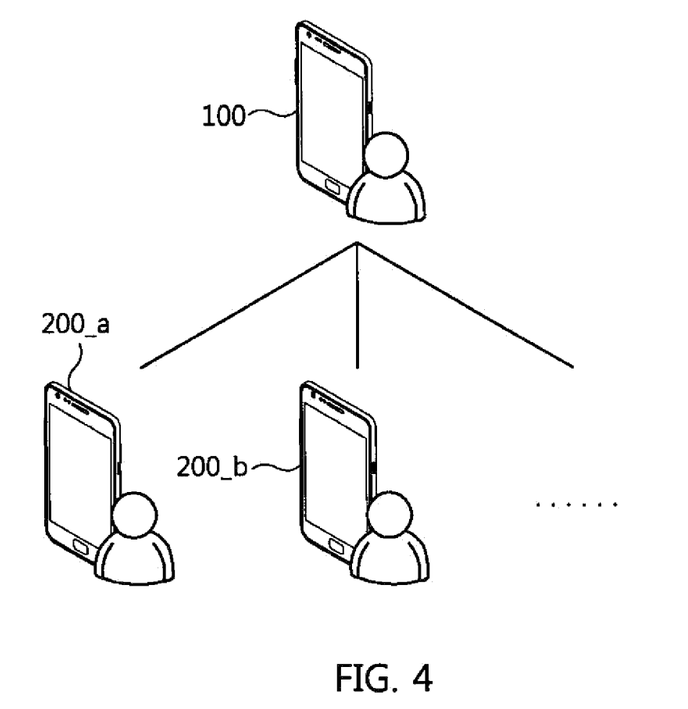
FIG. 4 is a diagram showing a relationship between one transmitting terminal and a plurality of receiving terminals according to an exemplary embodiment of the present invention.

As shown in FIG. 4, in the case in which a response request is transferred using an address book registered in the transmitting terminal 100, when a response is received from the receiving terminals 200_a and 200_b, a user may select the target to and from which the fake communication data are to be transmitted and received in a terminal list 200_a and 200_b (See FIG. 4) corresponding to the received response.

The communication controlling unit 130 divides the targets selected by the target selecting unit 120 into groups and controls a time in which communication is performed for each of the groups. Here, the communication controlling unit 120 divides communication targets into the groups and controls the time in which communication is performed for each of the groups in order to effectively hide corresponding personal information and a human network of the terminal.

For example, since it is not good in terms of concealment that anyone frequently communicates with a person registered as a boss in the address book in the terminal before bed or frequently communicates with a person registered as a family in the address book in working hours, it may cause a doubt of the attacker.

Therefore, phone numbers of the receiving terminals installing the FCA are divided into groups such as a group with which communication is to be mainly performed in the daytime, a group with which communication is to be mainly performed at night, and the like, and the fake communication data are transmitted at different times for each of the groups.

The possibility that the fake communication data according to an exemplary embodiment of the present invention will be generated is the same as a normal distribution having the center of each time as an average value.

For example, in the case in which a daytime is set to twelve o'clock to eighteen o'clock, a "fake communication generation possibility" that the fake communication data will be generated is the same as a normal distribution having fifteen o'clock as an average. Although a transmission time of the fake communication data depending on the group may be basically classified into morning, noon, and evening, it may be arbitrarily defined by the user. In addition, a time in which the fake communication data are to be maximally transmitted may be set (an average value of a normal distribution of the fake communication generation possibility). Furthermore, a list of phone numbers for which the fake communication data are to be generated, a weight depending on the phone numbers, and the like, may be set by the user. The fake communication generation possibility may be represented by the following Equation 1 without setting these functions in detail.

$$p_{fake} = \frac{\alpha}{\sigma\sqrt{2\Pi}} e^{-\frac{(x-\mu)^2}{2\sigma^2}} + b \qquad \text{[Equation 1]}$$

Referring to Equation 1, in generation decision of the fake communication data, a generation decision time is received as a parameter to generate random numbers per generation decision time, and fake communication is generated when the generated random value is higher than a fake communication generation possibility of a current time. A normal distribution variation, a maximum value adjustment (a), an intercept (b), and the like, of the generation decision as well as the generation decision time are input as parameters, thereby making it possible to adjust a fake communication amount. When the generation of the fake communication is decided, the fake communication data may be transmitted to several persons.

The data transmitting unit 140 transfers the fake communication data to the corresponding receiving terminal depending on a control result of the communication controlling unit 130.

Figure 3:
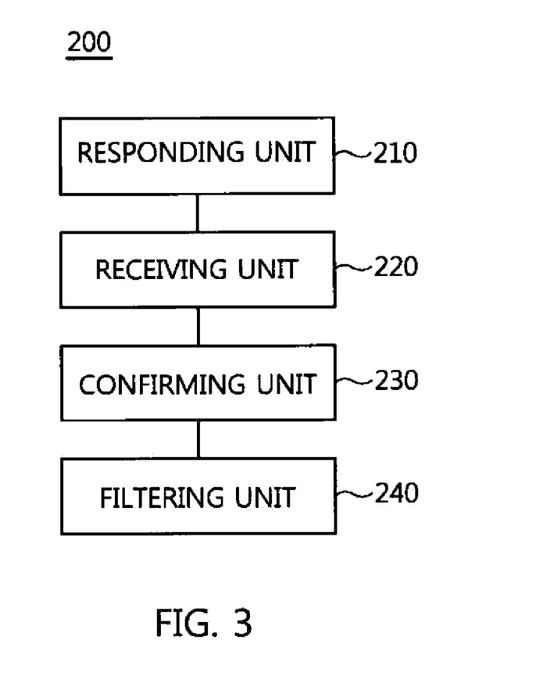
FIG. 3 is a configuration diagram schematically showing a receiving terminal receiving fake communication data according to an exemplary embodiment of the present invention.

FIG. 3 is a configuration diagram schematically showing a receiving terminal receiving fake communication data according to an exemplary embodiment of the present invention.

Referring to FIG. 3, the receiving terminal 200 may include a responding unit 210, a receiving unit 220, a confirming unit 230, and a filtering unit 240.

The responding unit 210 transfers a response corresponding to the response request received from the transmitting terminal 100.

The receiving unit 220 receives the fake communication data from the transmitting terminal 100.

The confirming unit 230 confirms whether an identification value meaning fake communication is present in the fake communication data received by the receiving unit 220.

The filtering unit 240 filters a corresponding traffic in the case in which the identification value is present in the fake communication data received by the receiving unit 220 as a confirming result of the confirming unit 230.

As described above, fake communication with only a user that wants to receive a fake communication service, that is, a terminal including the fake communication application (FCA) is performed.

Next, a method for transmitting fake communication data in a transmitting terminal will be described in detail with reference to FIG. 5.

Figure 5:
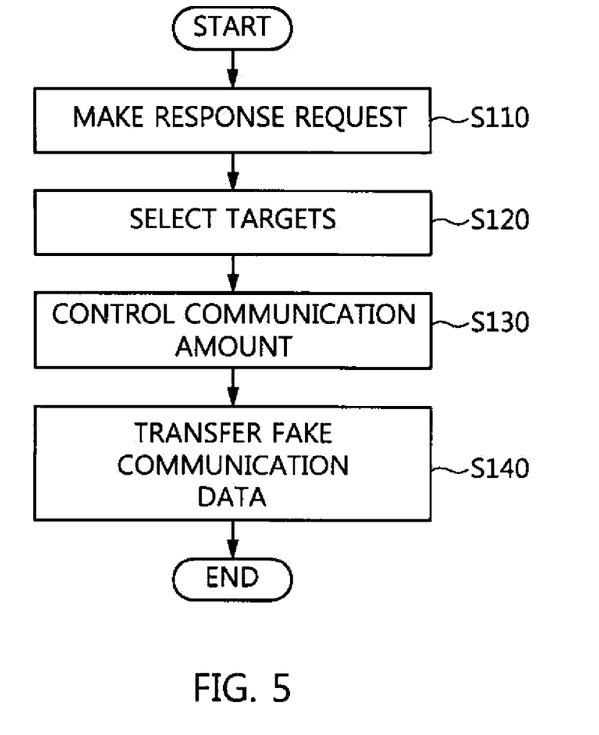
FIG. 5 is a flow chart showing a method for transmitting fake communication data according to an exemplary embodiment of the present invention.

FIG. 5 is a flow chart showing a method for transmitting fake communication data according to an exemplary embodiment of the present invention.

Referring to FIG. 5, the transmitting terminal 100 makes a response request to whether or not the fake communication application (FCA) is presented in an opponent terminal using an address book registered in the terminal in order to decide targets to and from which the fake communication data are to be transmitted and received, that is, receiving terminals (S110).

The transmitting terminal 100 receives a response corresponding to the response request and selects the targets to and from which the fake communication data are to be transmitted and received in a terminal list corresponding to the received response (S120).

The transmitting terminal 100 divides the targets selected in S120 into groups and controls a time in which communication is performed for each of the groups, that is, a communication amount (S130).

The transmitting terminal 100 transmits the fake communication data to the corresponding receiving terminal depending on a control result in S130 (S140).

Next, a method for receiving fake communication data in a receiving terminal will be described in detail with reference to FIG. 6.

Figure 6:
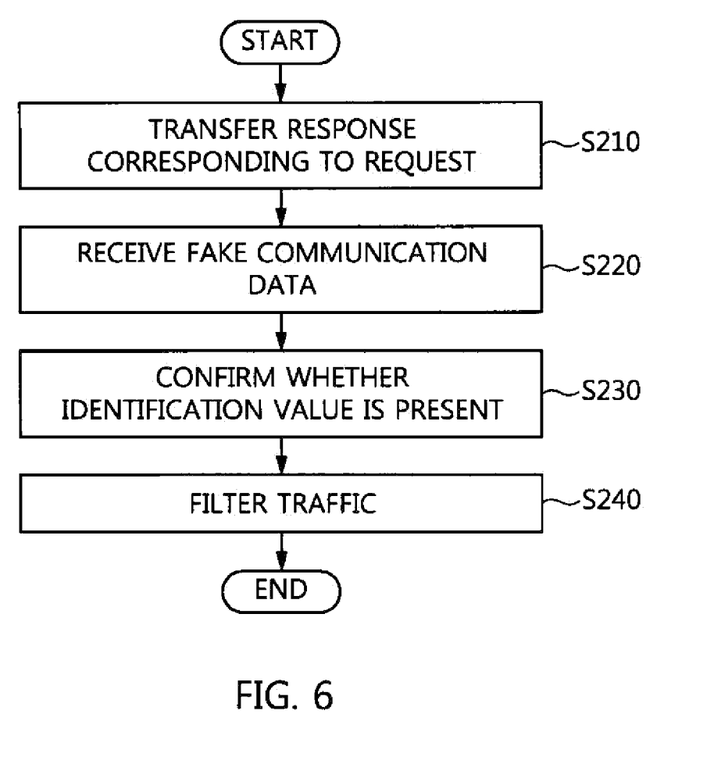
FIG. 6 is a flow chart showing a method for receiving fake communication data according to an exemplary embodiment of the present invention.

FIG. 6 is a flow chart showing a method for receiving fake communication data according to an exemplary embodiment of the present invention.

Referring to FIG. 6, the receiving terminal 200 transfers a response corresponding to the response request received from the transmitting terminal 100 (S210).

The receiving terminal receives the fake communication data from the transmitting terminal 100 transferring the response in S210 (S220).

The receiving terminal 200 confirms whether an identification value meaning fake communication is present in the fake communication data received in S220 (S230).

The receiving terminal 200 filters a corresponding traffic in the case in which the identification value is present in the received fake communication data as a confirming result in S230.

As described above, in the present invention, the fake communication data are transmitted and received between the terminals, that is, smart phones to generate the fake communication, such that the attacker does not identify normal communication, thereby making it possible to prevent leakage of personal information such as call targets, communication patterns of each target, a data communication tendency, and the like, of the traffic of the smart phone.

In accordance with the present invention, the fake communication data artificially generated so that the attacker does not identify the normal communication between the terminals are transmitted and received, thereby making it possible to prevent personal information, important business information of the terminal user, and the like, from being extracted from a communication traffic patterns of the terminals by the attacker even though traffics of the terminals are monitored by the attacker (for example, a malicious application).

Hereinabove, optimal exemplary embodiments of the present invention have been disclosed in the accompanying drawings and the present specification. Although specific terms have been used in the present specification, they are only used for the purpose of describing the present invention and are not used for limiting the meaning or the scope of the present invention, which is disclosed in the appended claims.

Therefore, it will be appreciated by those skilled in the art that various modifications and other equivalent exemplary embodiments are possible. Accordingly, the actual technical protection scope of the present invention is to be determined by the spirit of the claims.

What is claimed is:

1. A method for transmitting fake communication data, comprising:
   making a response request to whether or not a fake communication application is presented in an opponent terminal using an address book registered in a terminal;
   receiving a response corresponding to the response request and selecting targets to and from which the fake communication data are to be transmitted and received in a terminal list corresponding to the received response;
   controlling a communication amount depending on the selected targets; and
   transmitting the fake communication data to a corresponding receiving terminal depending on a control result,
   wherein the controlling includes dividing the selected targets into groups and setting a weight depending on a phone number with which communication is performed for each of the groups to control the communication amount.

2. The method for transmitting fake communication data of claim 1, wherein the controlling includes dividing the selected targets into groups and controlling a time in which communication is performed for each of the groups.

3. The method for transmitting fake communication data of claim 2, wherein in the controlling of the time in which communication is performed for each of the groups, an average value of a normal distribution having a center of each time as an average value is controlled.

4. A terminal for transmitting fake communication data, comprising:
   a response requesting unit making a response request to whether or not a fake communication application is presented in an opponent terminal using an address book registered in a terminal;
   a target selecting unit receiving a response corresponding to the response request and selecting targets to and from which the fake communication data are to be transmitted and received in a terminal list corresponding to the received response;
   a communication controlling unit controlling a communication amount depending on the selected targets; and
   a data transmitting unit transmitting the fake communication data to a corresponding receiving terminal depending on a control result,
   wherein the communication controlling unit divides the selected targets into groups and sets a weight depending on a phone number with which communication is performed for each of the groups to control the communication amount.

5. The terminal for transmitting fake communication data of claim 4, wherein the communication controlling unit divides the selected targets into groups and controls a time in which communication is performed for each of the groups.

6. The terminal for transmitting fake communication data of claim 5, wherein the communication controlling unit controls an average value of a normal distribution having a center of each time as an average value.

* * * * *